United States Patent
Poetsch

[19]

[11] Patent Number: 6,141,039
[45] Date of Patent: *Oct. 31, 2000

[54] LINE SEQUENTIAL SCANNER USING EVEN AND ODD PIXEL SHIFT REGISTERS

[75] Inventor: Dieter Poetsch, Ober-Ramstadt, Germany

[73] Assignee: U.S. Philips Corporation, New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/798,344

[22] Filed: Feb. 10, 1997

[30] Foreign Application Priority Data

Feb. 17, 1996 [DE] Germany ............................ 196 05 938

[51] Int. Cl.[7] ................................................. H04N 5/253
[52] U.S. Cl. .............................. 348/96; 348/97; 250/208
[58] Field of Search .................................. 348/96, 97, 98, 348/101, 282, 283; 250/208; 347/241; 235/462; 358/514, 483; H04N 5/253

[56] References Cited

U.S. PATENT DOCUMENTS

| | | | |
|---|---|---|---|
| 427,899 | 7/1890 | Ganguly et al. | 348/96 |
| 4,389,643 | 6/1983 | Hill | 340/825.48 |
| 4,524,392 | 6/1985 | Poetsch | 358/214 |
| 4,639,787 | 1/1987 | Isogai et al. | 358/214 |
| 4,641,185 | 2/1987 | Alston et al. | 358/75 |
| 4,973,833 | 11/1990 | Takada et al. | 250/208 |
| 5,023,711 | 6/1991 | Erhardt | 348/96 |
| 5,136,402 | 8/1992 | Nagano | 358/483 |
| 5,241,404 | 8/1993 | Furukawa et al. | 358/466 |
| 5,262,631 | 11/1993 | Yamaoka et al. | 250/208 |
| 5,515,097 | 5/1996 | Munechika et al. | 347/241 |
| 5,526,040 | 6/1996 | Foley | 348/97 |
| 5,548,327 | 8/1996 | Gunday et al. | 348/97 |
| 5,682,200 | 10/1997 | Schilling | 348/97 |
| 5,773,808 | 6/1998 | Laser | 235/462 |
| 5,784,101 | 7/1998 | Hasegawa | 348/282 |

FOREIGN PATENT DOCUMENTS

| | | | |
|---|---|---|---|
| 2130045 | 5/1984 | United Kingdom | H04N 3/15 |
| 2203916 | 10/1998 | United Kingdom | H04N 3/15 |

OTHER PUBLICATIONS

"CCD181, Variable–Element High–Speed Linear Image Sensor" by Fairchild Weston, 1986.

"Fernsehsysteme mit kompatibal erhohter Bildqualitat—ein Systemvergleich" by Franz Stollenwerk and Hartmut Schroder in the magazine Rundfunktechnische Mitteilungen, pp. 224 to 234, particularly p. 228.

*Primary Examiner*—Chris S. Kelley
*Assistant Examiner*—Tung Vo
*Attorney, Agent, or Firm*—Gregory L. Thorne

[57] ABSTRACT

A scanner for line-sequentially scanning a film frame by means of linear image sensors in which the charges of the light-sensitive pixels (1) are transferred to two shift registers (4, 5). To enhance the horizontal resolution in the picture display, the outputs of the two shift registers are line-sequentially and alternately connected (10) to the common input of the subsequent signal—processing channel for generating a progressive quincunx structure of the line-sequential pixel charges.

6 Claims, 1 Drawing Sheet

LINE SEQUENTIAL SCANNER USING EVEN AND ODD PIXEL SHIFT REGISTERS

BACKGROUND OF THE INVENTION

Field of the Invention

The invention relates to a scanner for line sequentially scanning a film frame transported with continuous motion through a frame scanning station by means of a linear image sensor with two shift registers, one of which applies the charges of the even pixels and the other applies the charges of the odd pixels to its respective output.

Such a scanner may be part of, for example, a telecine scanner in which a plurality of linear image sensors for scanning the different colors of the film frames are used. In these linear image sensors, charges corresponding to the luminance of each individual pixel are transported in the rhythm of clock signals to an output or to a plurality of outputs and can then be derived as a signal. A clock period has such a signal variation that at each output a maximum value, which is dependent on the luminance, succeeds a minimum value which is independent of the luminance. Conventionally used semiconductor linear image sensors have two outputs whose output signals are phase-shifted by one pixel width. Since the output signals of the linear image sensors are very small, corresponding amplifiers are provided which are already integrated in some of these semiconductor linear image sensors.

DESCRIPTION OF THE RELATED ART

Such a linear image sensor is described, for example in information sheet "CCD181, Variable-Element High-Speed Linear Image Sensor" by Fairchild Weston, 1986. This linear image sensor has, inter alia, 2592 light-sensitive pixels, with the charges of the odd pixels being transferred to a first shift register and the charges of the even pixels being transferred to a second shift register. The outputs of the shift registers are normally connected via a respective amplifier to a common input of the subsequent analog processor for processing the video signal, for example, by adding the output signals of the two amplifiers so that a television line is formed by the respective number of illuminated pixels.

Since it is now possible to select different lengths of the line and hence, a different number of illuminated pixels, dependent on the field of use, the associated transfer or channel bandwidth is also different. It is known that film scanning requires a possibly satisfactory resolution at a normal channel bandwidth, i.e., a bandwidth which is not increased, so that it has been found to be efficient to illuminate approximately half the number of light-sensitive pixels. To enhance the horizontal resolution, particularly also for the new display format 16:9 to an even further extent, an offset scanning upon diagonal Pre- and postfiltering is known from "Fernsehsysteme mit kompatibel erhöhter Bildqualität - ein Systemvergleich" by Franz Stollenwerk and Hartmut Schröder in the magazine Rundfunktechnische Mitteilungen, pp. 224 to 234, particularly p. 228, referring to the processing of HDTV signals—thus at an increased bandwidth. However, this offset scanning leads to a considerably larger number of circuit elements.

SUMMARY OF THE INVENTION

It is therefore an object of the present invention to enhance the horizontal resolution in the picture display, without any extension of the channel bandwidth.

This object is solved in that the outputs of the two shift registers are line-sequentially and alternately connected to the common input of the subsequent signal-processing channel for generating a progressive quincunx structure of the line-sequential pixel charges.

The scanner according to the invention has the advantage that the enhanced horizontal resolution is achieved at the same channel bandwidth and with a considerably smaller number of components, as compared with the prior art.

These and other aspects of the invention will be apparent from and elucidated with reference to the embodiments described hereinafter.

DESCRIPTION OF THE PREFERRED EMBODIMENTS

Figure 1:
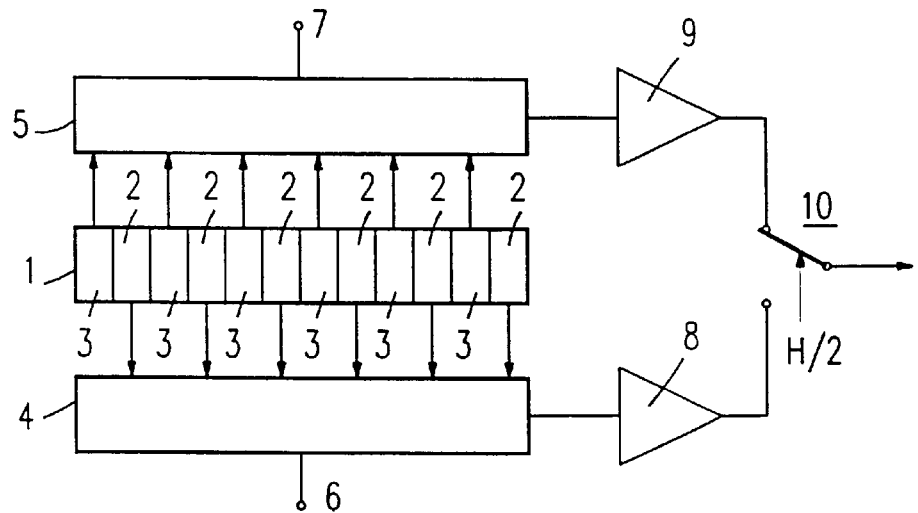
FIG. 1 shows diagrammatically, a semiconductor linear image sensor comprising the scanner according to the invention.

FIG. 1 shows a semiconductor linear image sensor which essentially consists of a line 1 of light-sensitive pixels 2 and 3, in which the reference numeral 2 denotes the even pixels and the reference numeral 3 denotes the odd pixels, and two shift registers 4 and 5 which transfer the charges from the light-sensitive area of the linear image sensor to the outputs in the rhythm of clock pulses supplied at 6 and 7. Amplifiers 8 and 9 having outputs from which the signals can be derived are connected to the outputs of the shift registers 4 and 5. The outputs of the amplifiers 8 and 9 are connected to a contact terminal of a change-over switch 10 which is switchable at half line frequency H/2.

Figure 2:
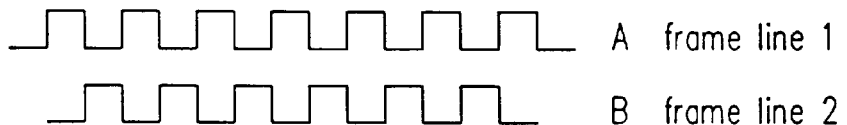
FIG. 2 shows the signals which can be derived from the output of the linear image sensor.

By progressive read-out, the video signals A and B, as shown in FIG. 2, are produced at the output of the switch 10, the signal A representing the line 1 and the signal B representing the line 2 of a frame. As can clearly be seen, the pulse amplitudes of the signal B occur between the pulse amplitudes of the signal A, i.e., they are shifted in phase with respect to each other by one pixel width.

Figure 3:
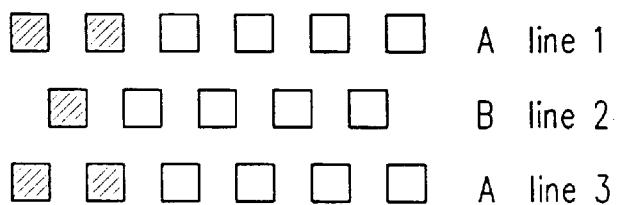
FIG. 3 shows the quincunx structure achieved by means of the invention.

FIG. 3 shows, diagrammatically, the resultant generated progressive quincunx structure in the display for three lines A, B, A. The number of pixels is equal in all lines, but the pixels of every second line are offset with respect to those in the first line. The resolution in the horizontal direction can thereby be improved without extending the channel bandwidth.

Figure 4:
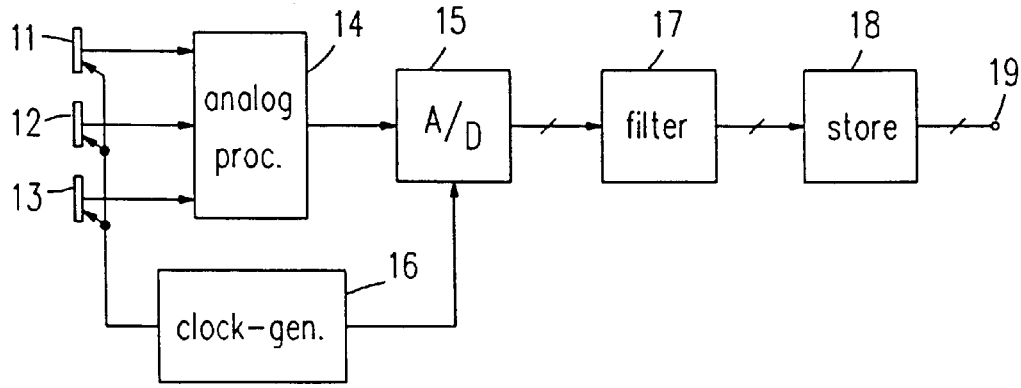
FIG. 4 is a block diagram showing the signal processing for the scanner according to the invention.

The block diagram in FIG. 4 shows the further processing of the picture signals generated by a plurality of semiconductor linear image sensors 11, 12, 13, for example, for the colors red, green and blue. The signals supplied by the linear image sensors 11, 12, 13 after scanning film frames (not shown) in the progressive quincunx structure, are first processed in an analog manner in a signal processor 14 and then digitized in an A/D converter 15. A clock signal generator 16 controls both the semiconductor linear image sensors 11, 12, 13 and the A/D converter 15 by means of the same clock signal, the clock signal for every second scanning line being shifted in phase with respect to the clock signal for every first scanning line by a distance of two juxtaposed pixels. The phase-shifted clock signal for every second scanning line may either be generated simply by means of a phase shift of the generated clock signal for the first scanning line, or by means of a double master clock frequency and its division. A planar FIR filter 17 is connected as an anti-alias filter to the output of the A/D converter 15 so as to suppress possible interference in the signal. As usual, a frame store 18 follows so as to convert the video signals generated by progressively scanning the film frames into standard television signals, using interlaced scanning, which video signals can be derived from the output 19.

What is claimed is:

1. A scanner for line-sequentially scanning a film frame transported with continuous motion through a frame scanning station comprising a linear image sensor with two shift registers, one of said two shift registers applying the charges of the even pixels of a first line to an output thereof, and the other of said two shift registers applying the charges of the odd pixels of a second line to an output thereof, wherein said even pixels of said first line and said odd pixels go said second line are non-overlapping pixels, and wherein, for enhancing a horizontal resolution in a picture display displaying an output from the scanner, the outputs of the two shift registers are line-sequentially and alternately connected to a common input of a subsequent signal-processing channel for generating a progressive quincunx structure of the line-sequential pixel charges.

2. A scanner as claimed in claim 1, characterized in that both the linear image sensor and an A/D converter in said subsequent signal-processing channel are controlled by a same clock frequency, clock signals for two spatially adjacent television lines being shifted in phase by a distance of two juxtaposed pixels of the linear image sensor.

3. A scanner as claimed in claim 2, characterized in that a phase-shifted clock signal for every second scanning line is generated by means of a phase shift of a master clock signal.

4. A scanner as claimed in claim 2, characterized in that a phase-shifted clock signal for every second scanning line is generated by means of a clock signal at one-half a master clock frequency and a subsequent frequency division.

5. A scanner as claimed in claim 2, characterized in that a planar FIR filter is connected to the output of the A/D converter.

6. A scanner as claimed in claim 5, characterized in that a line-sequential phase shift of the clock signal also takes place for the A/D converter and the planar FIR filter, as well as for a frame store connected to an output of the planar FIR filter.

* * * * *